May 18, 1954     E. A. BONNEY     2,678,560
SUPERSONIC WIND TUNNEL
Filed Oct. 9, 1952     4 Sheets-Sheet 1

INVENTOR
EVERARD A. BONNEY

BY

ATTORNEYS

May 18, 1954  E. A. BONNEY  2,678,560
SUPERSONIC WIND TUNNEL
Filed Oct. 9, 1952  4 Sheets-Sheet 3
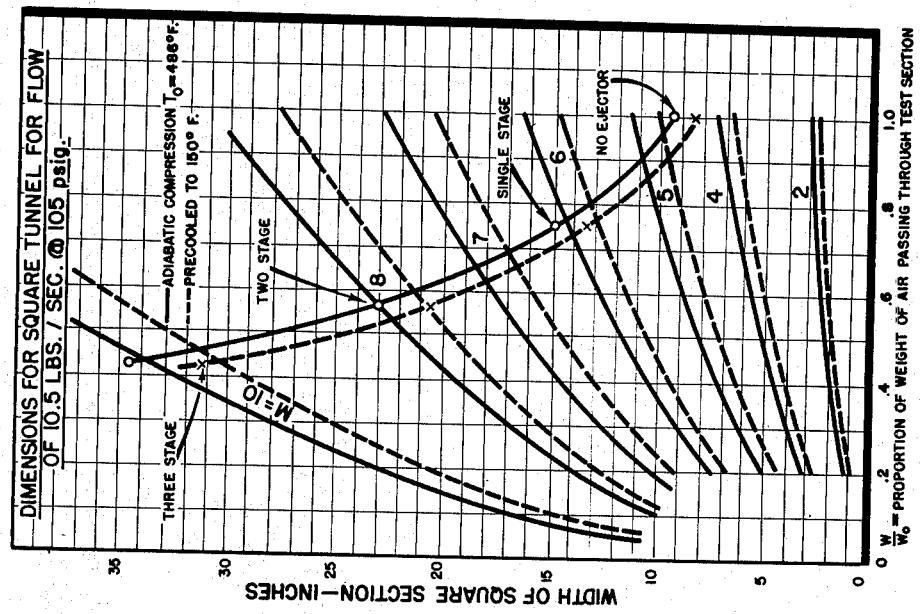
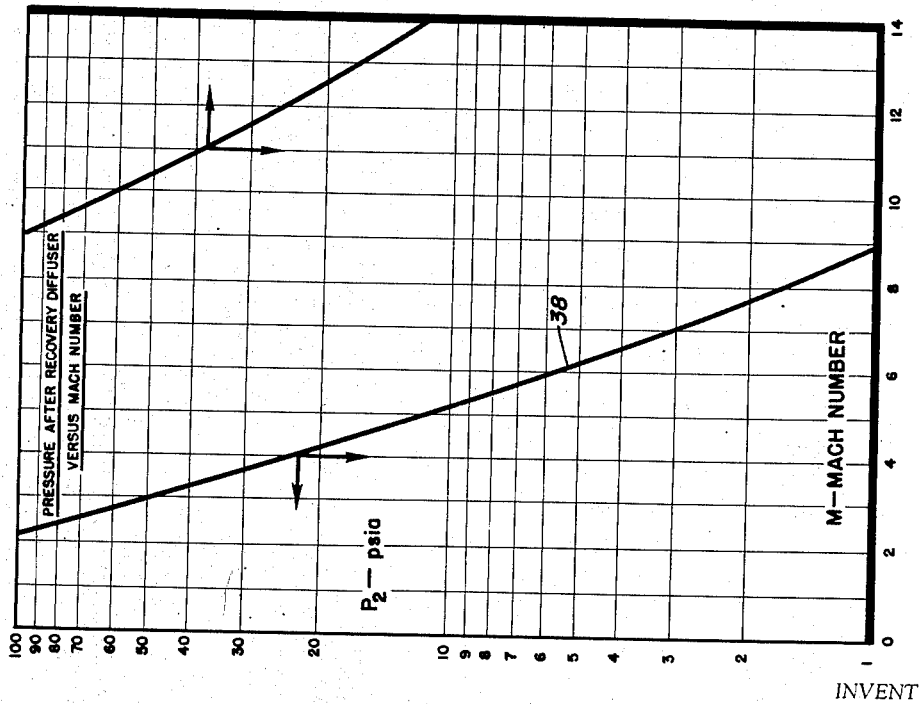
INVENTOR
EVERARD A. BONNEY
BY
ATTORNEYS May 18, 1954 E. A. BONNEY 2,678,560
SUPERSONIC WIND TUNNEL
Filed Oct. 9, 1952 4 Sheets-Sheet 4

INVENTOR
EVERARD A. BONNEY
BY
ATTORNEYS

Patented May 18, 1954

2,678,560

UNITED STATES PATENT OFFICE 2,678,560

SUPERSONIC WIND TUNNEL

Everard A. Bonney, Silver Spring, Md., assignor to the United States of America as represented by the Secretary of the Navy Application October 9, 1952, Serial No. 313,959

7 Claims. (Cl. 73—147)

The present invention relates generally to wind tunnels, and particularly to pressure ejectors for extending the Mach numbers of fixed supersonic wind tunnels.

It is one of the principal objects of this invention to provide a pressure ejector arrangement for extending the Mach range of a supersonic wind tunnel facility of given maximum pressure and mass flow.

Another object of the invention is to provide an improved supersonic wind tunnel which utilizes a continuous supply of high-pressure air at the inlet, and multiple-stage ejector-diffusers at the exit to improve the overall pressure ratio and corresponding Mach number attainable.

Other objects and many of the attendant advantages of this invention will be more readily appreciated as the same becomes understood by reference to the following detailed description when considered in connection with the accompanying drawings, and in which:

Fig. 4 shows curves of pressure after recovery in the diffuser versus Mach number;

Fig. 5 shows curves for obtaining dimensions of a square tunnel for an air flow of 10.5 lbs. per second at 105 p. s. i. g.;

In accordance with the invention, a pressure ejector supersonic wind tunnel is provided which utilizes a continuous supply of high pressure air at the inlet and multiple stage ejector diffusers at the exit to improve the overall pressure ratio and to extend the Mach range of the wind tunnel.

In an effort to determine what pressure ratios could be obtained by use of pressure ejectors, considerable research and study has been made of the available literature. From this study, it was apparent that both theoretical and experimental data on this subject are nearly nonexistent.

Figure 7:
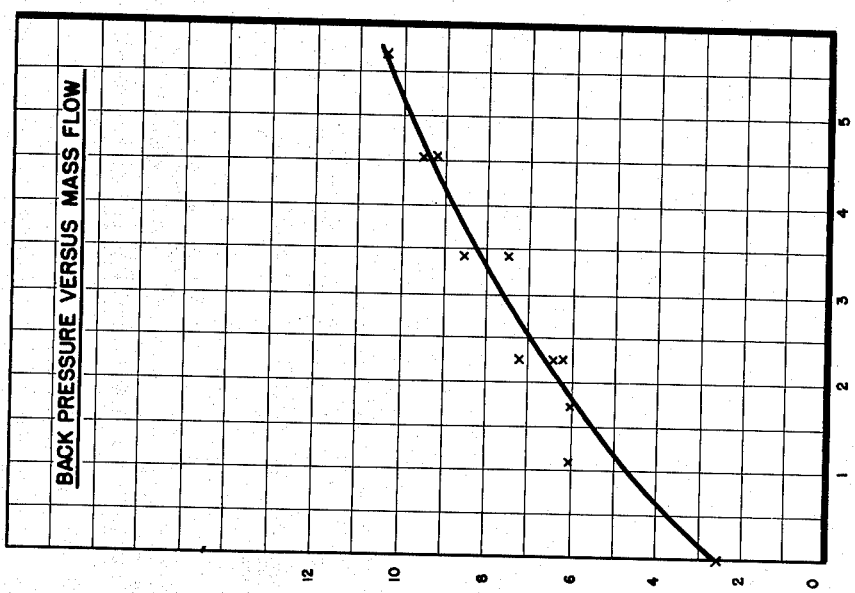
Fig. 7 shows a curve for back pressure versus mass flow.

However, it has been pointed out that a pressure ratio of three (3) to one (1) with mass ratios also of three (3) to one (1), that is, three (3) through a test section to one (1) through an ejector are obtainable. These figures are for the straight induction type of wind tunnel with atmospheric pressure at the supply and exit ends. These figures are in reasonable agreement with results obtained by others wherein the exhaust from one burner was used as an ejector to reduce the exit pressure of a test burner, as shown in Fig. 7. Therefore, for lack of more definite data, the above figures were used for the development of the present invention.

Figure 1:
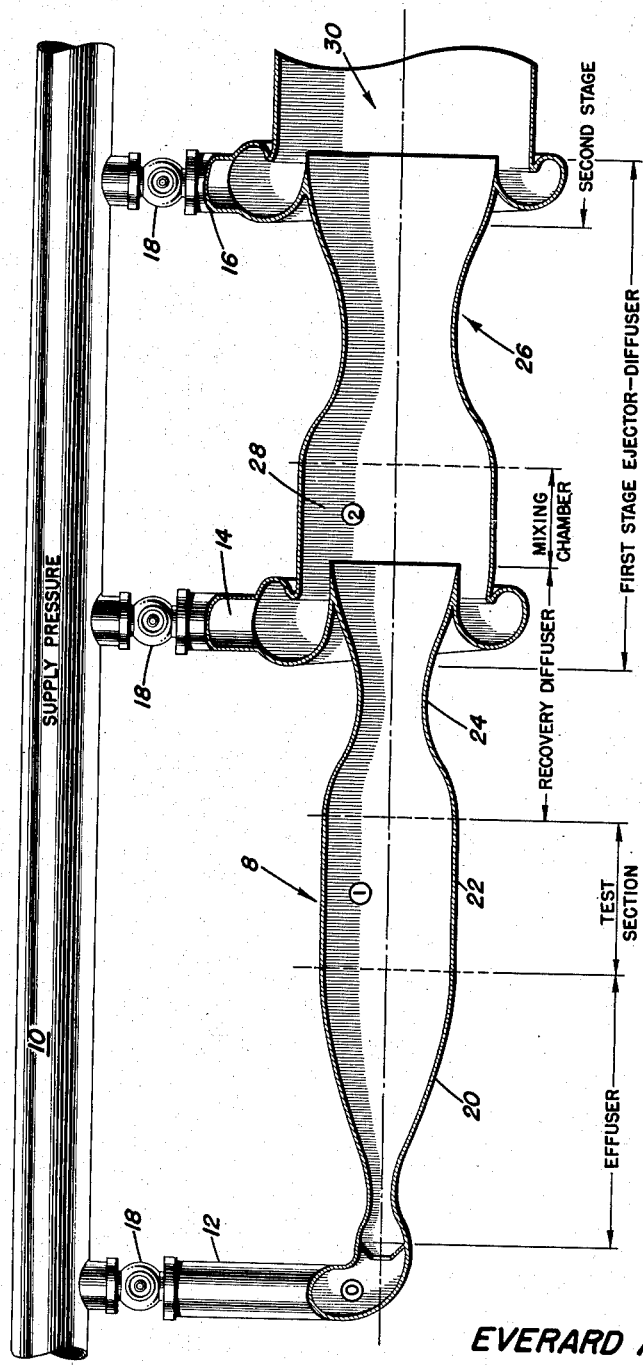
Fig. 1 is a schematic diagram of a pressure ejector supersonic wind tunnel embodying the features of the invention.

It has been ascertained that it might be possible to place several ejectors (each with a diffuser) in series as a multi-stage ejection system, thereby reducing the pressure after the recovery diffuser still further and making it possible to test at still higher Mach numbers. This arrangement has been incorporated in the development of this invention with the assumption that each stage will reduce the back pressure by a factor of one-third while utilizing an amount of air equal to one-third of the amount of tunnel air approaching the particular ejector being considered. The ejector can be either the wall type as shown in Fig. 1 or the internal type as shown in J. H. Keenan and E. P. Neumann's article entitled "A Simple Air Ejector," which appeared in the Journal of Applied Mechanics, March, 1942.

As shown in Fig. 1 of the drawings, a pressure ejector supersonic wind tunnel 8 is supplied by a continuous supply of high-pressure air from a compressor source (not shown) through passageways 10, 12, 14, and 16. Each passageway 12, 14, and 16, includes a pressure regulating valve 18 for regulating the air flow. The air introduced through the passageway 12 passes through an effuser section 20 where it is raised to supersonic condition and then it flows to a test section 22 where it is utilized for testing purposes.

From test section 22, the air medium flows through a recovery diffuser section 24 to a first stage ejector-diffuser 26, which includes a mixing chamber 28 for mixing the air flow from recovery diffuser section 24 with the air introduced through passageway 14. The air introduced through passageway 14 is used to increase the momentum of the air from section 24. From the first stage ejector-diffuser 26, the air then flows to a second stage ejector-diffuser 30, where the procedure is repeated.

Based on the above description, certain theoretical equations and calculations will now be presented.

If the diffuser efficiency is known, the overall pressure ratio (supply section to exit of recovery diffuser) can be determined. The following principal symbols will be used in the analysis now to be presented:

$p$ = static pressure, lbs./sq. in.
$\rho$ = density, lbs./cu. ft.
$T$ = absolute temperature ° Rankin
$M$ = Mach number in the test section
$\gamma$ = ratio of specific heats—taken as 1.4 for air.
$w$ = weight, lbs. per sec.
$A$ = area, sq. ft.
$R$ = gas constant = 53.3 ft./° R. for air
$V$ = velocity, ft. per sec.
$g$ = acceleration due to gravity = 32.16 ft./sec.$^2$
$w/w_0$ = ratio of weight of air going through the test section to total weight.
$a$ = velocity of sound in ft. per sec.
Subscripts (see Fig. 1):
0 = supply section stagnation conditions
1 = test section
2 = exit of recovery diffuser.

The pressure ratio is given by $$\frac{p_0}{p_2} = \left(\frac{p_0}{p_1}\right)^{1-\eta} \quad (1)$$

where $$\frac{p_0}{p_1}$$

is a function of Mach number as follows:

$$\frac{p_0}{p_1} = \left(1 + \frac{\gamma-1}{2}M^2\right)^{\frac{\gamma}{\gamma-1}} \quad (2)$$

Now the dimensions of the test section for any given mass flow of air will be found as follows:

$$w = A_1 \rho_1 V_1 \text{ and } A_1 = \frac{w}{\rho_1 V_1} \quad (3)$$

where: $w$ is given, $$\rho_1 = \frac{\rho_0}{\rho_0/\rho_1} = \frac{\frac{144 p_0}{RT_0}}{\left(1+\frac{\gamma-1}{2}M^2\right)^{\frac{1}{\gamma-1}}} \quad (4)$$

and $$V_1 = aM = M\sqrt{\gamma g R T_1} = \sqrt{\gamma g R} \times M \times \sqrt{\frac{T_0}{1+\frac{\gamma-1}{2}M^2}} \quad (5)$$

Therefore, $$A_1 = w\sqrt{\frac{RT_0}{\gamma g}} \frac{\left(1+\frac{\gamma-1}{2}M^2\right)^{\frac{\gamma+1}{2(\gamma-1)}}}{p_0 M} \text{ sq. ft.} \quad (6)$$

For air at $T_0 = 486°$ F., $$A_1 = .0204 \left(\frac{w}{w_0}\right) \frac{(1+.2M^2)^3}{M}$$

and at $T_0 = 150°$ F., $$A_1 = .0164 \left(\frac{w}{w_0}\right) \frac{(1+.2M^2)^3}{M}$$

where $w/w_0$ = ratio of amount of air going through the tunnel to total weight.

Curves of anticipated performance based on the assumptions above are shown in Figs. 2 through 6.

Figure 3:
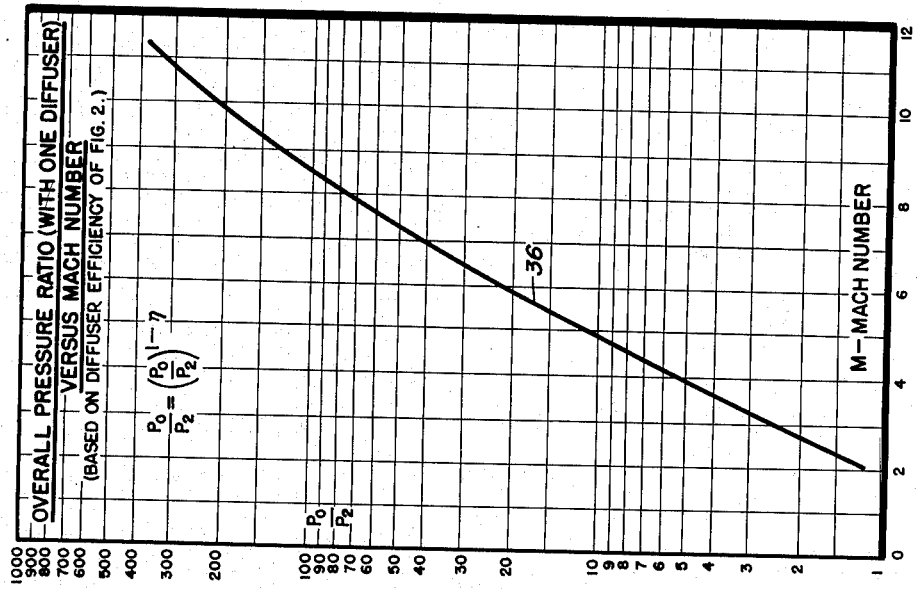
Fig. 3 is a curve of overall pressure ratio using one diffuser versus Mach number.
Figure 2:
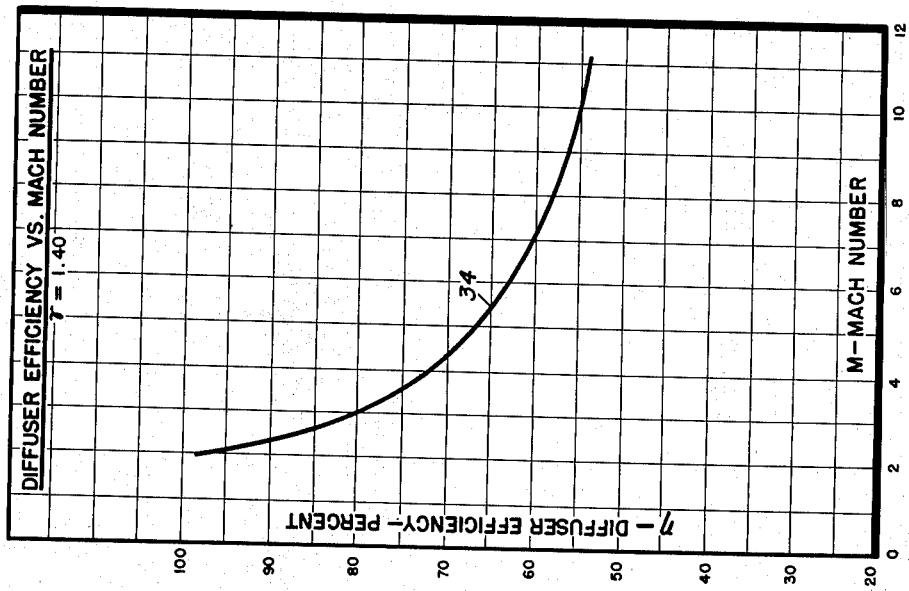
Fig. 2 is a curve of diffuser efficiency versus Mach number.

Figs. 2, 3, and 4 show curves 34, 36, and 38, respectively, of diffuser efficiency based on a Kantrowitz-Donaldson type of diffuser as calculated for a supersonic wind tunnel, the resulting overall pressure ratio required, and the corresponding pressure after the recovery diffuser based on a supply section pressure of 120 p. s. i. a.

Figure 6:
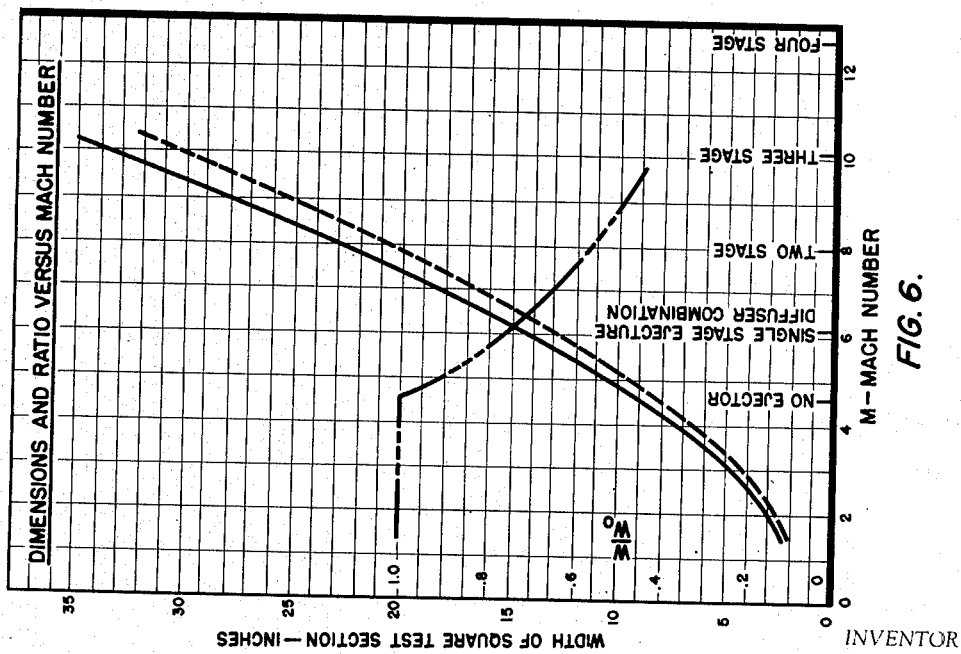
Fig. 6 shows curves of dimensions of a wind tunnel and mass ratio versus Mach numbers.

Fig. 5 gives the size of test section possible as a function of the Mach number and proportional amount of air which is pumped through the test section for two conditions of initial temperature. The first condition is air at the temperature resulting from the adiabatic compression from atmospheric to the supply pressure and the second considers the case wherein the air is pre-cooled (after compression) to an arbitrary temperature of 150 degrees F. in order to keep the test equipment at more reasonable handling temperatures. On Fig. 5 is also superimposed curves of assumed ejector performance, i. e., Mach numbers attainable for given amounts of bypassed air, and the resulting limiting dimensions and the ratio of test section to total air supply are cross-plotted as a function of Mach number and are shown in Fig. 6.

Fig. 7 represents test results of a simple ejector similar to the type intended for use in this design, where $\frac{w}{w_0}$ = ratio of amount of air going through the test section to total weight The Mach number obtainable with no ejectors can be read from Fig. 4 at $p_2 = 14.7$ p. s. i. a. The following table gives the Mach numbers and weight ratios for successive numbers of stages up to 3. The analysis was not carried out for a greater number of stages because three (3) stages are sufficient to obtain a Mach number of ten (10).

| (1) No. of stages | 0 | 1 | 2 | 3 |
|---|---|---|---|---|
| (2) Pressure ratio (from atmospheric) | 1 | ⅓ | ⅑ | 1/27 |
| (3) $P_2$ 14.7×② | 14.7 | 4.90 | 1.632 | .544 |
| (4) M (Fig. 4) | 4.58 | 6.13 | 7.98 | 10.12 |
| (5) Test Section air weight* (parts) | 3 | 3 | 4 | 5⅓ |
| (6) Bypassed air (each ejector) (parts) = ⑤/3 | 0 | 1 | 1⅓ | 1⅙ |
| (7) Total air (parts) = ⑤+⑥ | 3 | 4 | 5⅓ | 7⅙ |
| (8) $w/w_0 = 3/⑦$ | 1.000 | .750 | .563 | .422 |

*Air weight forward of ejector being considered.

Adding this data to Fig. 5 a cross-plot can be made showing maximum dimensions of the tunnel and proportional amount of air going through the tunnel as a function of Mach number, as shown in Fig. 6.

In the event that it is not possible to obtain the successive pressure ratios of three (3) to one (1) (or that more air is required in the ejectors to obtain it) by this method, the limiting line of Fig. 5 will be lowered and the allowable dimensions reduced.

Obviously many modifications and variations of the present invention are possible in the light of the above teachings. It is therefore to be understood that within the scope of the appended claims the invention may be practiced otherwise than as specifically described.

What is claimed is:

1. An arrangement for extending the Mach range of a supersonic wind tunnel facility of a given maximum pressure and mass flow, comprising a source of high pressure air, an effuser for raising a portion of said high pressure air to supersonic condition, a section for testing aerodynamic models, a diffuser for decreasing the back pressure downstream of said test section, by-pass means for said source of high pressure air, and means in series with said by-pass means for receiving said by-passed air and further reducing the pressure at the exit of said diffuser, thereby extending the Mach range of said wind tunnel facility.

2. An arrangement for extending the Mach range of a supersonic wind tunnel facility of a given maximum pressure and mass flow, comprising a source of high pressure air, an effuser for raising a portion of said high pressure air to supersonic condition, a section for testing aerodynamic models, a diffuser for decreasing the back pressure downstream of said test section, by-pass means for said source of high pressure air, and an ejector-diffuser in series with said by-pass means for receiving said by-passed air and further reducing the pressure at the exit of said diffuser, thereby extending the Mach range of said wind tunnel facility.

3. An arrangement for extending the Mach range of a supersonic wind tunnel facility of a given maximum pressure and mass flow comprising a source of high pressure air, an effuser for raising a portion of said high pressure air to supersonic condition, a section for testing aerodynamic models, a diffuser for decreasing the back pressure downstream from said test section, by-pass means for said source of high pressure air, and a plurality of ejector-diffusers in series with said by-pass means for receiving the by-passed air and for further reducing the pressure at the exit of said diffuser, a mixing chamber in each of said ejector-diffusers, thereby extending the Mach range of said wind tunnel facility.

4. In combination, a supersonic wind tunnel including an effuser, a test section, and a recovery diffuser, a source of high pressure air, said effuser being utilized to raise a portion of said high pressure air to a supersonic condition, by-pass means for said high pressure air, and means in series with said by-pass means for receiving said by-passed air and for further reducing the pressure at the exit of said recovery diffuser, thereby extending the Mach number of said wind tunnel.

5. An arrangement as set forth in claim 4, wherein said next-to-last mentioned means comprises a plurality of ejector-diffusers.

6. An arrangement as set forth in claim 5, wherein said ejector-diffusers are arranged in series at the exit of said wind tunnel.

7. An arrangement as set forth in claim 6, and a mixing chamber in each of said ejector-diffusers.

References Cited in the file of this patent

UNITED STATES PATENTS

| Number | Name | Date |
|---|---|---|
| 1,421,844 | Schmidt | July 4, 1922 |
| 1,449,220 | Ehrhart | Mar. 20, 1923 |
| 1,647,402 | Eynon | May 1, 1927 |

FOREIGN PATENTS

| Number | Country | Date |
|---|---|---|
| 712,706 | Germany | Oct. 23, 1941 |